US008532579B2

(12) United States Patent
Tanigawa et al.

(10) Patent No.: US 8,532,579 B2
(45) Date of Patent: Sep. 10, 2013

(54) RADIO BASE STATION, RADIO EQUIPMENT, AND RADIO EQUIPMENT CONTROLLER

(75) Inventors: Daisuke Tanigawa, Kawasaki (JP); Hidehiko Oyane, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 91 days.

(21) Appl. No.: 13/128,581

(22) PCT Filed: Nov. 10, 2009

(86) PCT No.: PCT/JP2009/069122
§ 371 (c)(1),
(2), (4) Date: Jul. 12, 2011

(87) PCT Pub. No.: WO2010/053196
PCT Pub. Date: May 14, 2010

(65) Prior Publication Data
US 2011/0269403 A1 Nov. 3, 2011

(30) Foreign Application Priority Data
Nov. 10, 2008 (JP) ................................ 2008-288137

(51) Int. Cl.
*H04B 17/00* (2006.01)
*H04J 3/12* (2006.01)
*H04B 1/38* (2006.01)

(52) U.S. Cl.
USPC ........ 455/67.11; 370/522; 370/523; 370/524; 455/561

(58) Field of Classification Search
USPC .............. 370/522–524; 455/67.11–68, 561
See application file for complete search history.

(56) References Cited

U.S. PATENT DOCUMENTS

| 6,628,945 | B1 * | 9/2003 | Koorapaty et al. ........... 455/434 |
| 7,702,245 | B1 * | 4/2010 | Mork et al. ................... 398/183 |
| 7,864,674 | B2 * | 1/2011 | Benveniste ................... 370/230 |
| 2006/0274865 | A1 | 12/2006 | Arunachalam | |

(Continued)

FOREIGN PATENT DOCUMENTS

| JP | 2000 286770 | 10/2000 |
| JP | 2007 507957 | 3/2007 |
| JP | 2007 189675 | 7/2007 |
| JP | 2008 205578 | 9/2008 |

OTHER PUBLICATIONS

International Search Report issued Dec. 15, 2009 in PCT/JP09/069122 filed Nov. 10, 2009.

(Continued)

*Primary Examiner* — Andrew Wendell
*Assistant Examiner* — Maryam Soltanzadeh
(74) *Attorney, Agent, or Firm* — Oblon, Spivak, McClelland, Maier & Neustadt, L.L.P.

(57) ABSTRACT

A radio equipment in a radio base station is configured to measure received signal strength of an uplink signal transmitted by a mobile station and includes a TRX function unit configured to transmit IQ data and control information to a radio equipment controller by using a frame including an IQ data region for mapping the IQ data and a control region for mapping the control information, the IQ data being obtained by subjecting the uplink signal to demodulation processing (orthogonal demodulation processing), and the TRX function unit is configured to map information indicating the received signal strength (RSSI) measured by the measurement unit to a fixed region in the control region.

8 Claims, 5 Drawing Sheets

(56) References Cited

U.S. PATENT DOCUMENTS

2007/0133477 A1    6/2007  Ebert et al.
2007/0171866 A1*   7/2007  Merz et al. .................... 370/330
2008/0200140 A1    8/2008  Kumura
2008/0225816 A1    9/2008  Osterling et al.
2012/0188985 A1*   7/2012  Miyamoto et al. ............ 370/331
2012/0230298 A1*   9/2012  Kitazoe et al. ................ 370/331
2013/0100948 A1*   4/2013  Irvine ........................... 370/350

OTHER PUBLICATIONS

Office Action issued Jun. 26, 2012 in Japanese Patent Application No. 2008-288137 (with English-language translation).

* cited by examiner

| | | | | |
|---|---|---|---|---|
| 0 | 64 | 128 | 192 | |
| 1 | 65 | 129 | 193 | HDLC |
| 2 | 66 | 130 | 194 | L1 inband Protocol |
| 3 | 67 | 131 | 195 | |
| 4 | 68 | 132 | 196 | |
| 5 | 69 | 133 | 197 | |
| 6 | 70 | 134 | 198 | |
| 7 | 71 | 135 | 199 | |
| 8 | 72 | 136 | 200 | |
| 9 | 73 | 137 | 201 | RESERVED |
| 10 | 74 | 138 | 202 | |
| 11 | 75 | 139 | 203 | |
| 12 | 76 | 140 | 204 | |
| 13 | 77 | 141 | 205 | |
| 14 | 78 | 142 | 206 | |
| 15 | 79 | 143 | 207 | |
| 16 | 80 | 144 | 208 | |
| 17 | 81 | 145 | 209 | |
| 18 | 82 | 146 | 210 | |
| 19 | 83 | 147 | 211 | Vendor Specific |
| 20 | 84 | 148 | 212 | |
| 21 | 85 | 149 | 213 | |
| 22 | 86 | 150 | 214 | |

⋮

| | | | |
|---|---|---|---|
| 61 | 125 | 189 | 253 |
| 62 | 126 | 190 | 254 |
| 63 | 127 | 191 | 255 |

RADIO BASE STATION, RADIO EQUIPMENT, AND RADIO EQUIPMENT CONTROLLER

TECHNICAL FIELD

The present invention relates to a radio base station including a radio equipment RE (Radio Equipment) and a radio equipment controller REC (Radio Equipment Control), the radio equipment RE, and the radio equipment controller REC.

BACKGROUND ART

A radio base station BTS (Base Transceiver Station) including a radio equipment RE and a radio equipment controller REC and configured to transmit and receive signals between the radio equipment RE and the radio equipment controller REC via an optical line or an electric line has heretofore been known.

In the above-described radio base station BTS, the radio equipment RE is configured to receive an uplink signal transmitted from a mobile station UE and to transmit IQ data obtained by subjecting the uplink signal to demodulation processing to the radio equipment controller REC.

SUMMARY OF THE INVENTION

Problem to be Solved by the Invention

However, the IQ data indicate relative received electric power of the uplink signal received by the radio equipment RE. Accordingly, there is a problem that the radio equipment controller REC cannot recognize the received electric power itself of the uplink signal.

As a consequence, the radio equipment controller REC is not able to provide an EUL (Enhanced Uplink) service and to perform call processing control or maintenance monitor control based on a total traffic volume.

The present invention has been made in view of the above-described problem. An objective of the present invention is to provide a radio base station which allows a radio equipment controller REC to recognize received electric power itself of an uplink signal received by a radio equipment RE, and to provide the radio equipment RE and the radio equipment controller REC.

Means to Solve the Problem

The first feature of the present invention is summarized in that a radio base station including a radio equipment and a radio equipment controller, wherein the radio equipment includes a measurement unit configured to measure received signal strength of an uplink signal transmitted by a mobile station, and a transmission unit configured to transmit IQ data and control information to the radio equipment controller by using a frame including an IQ data region for mapping the IQ data and a control region for mapping the control information, the IQ data being obtained by subjecting the uplink signal to demodulation processing, and the transmission unit is configured to map information indicating the received signal strength measured by the measurement unit to a fixed region in the control region.

The second feature of the present invention is summarized in that a radio equipment provided in a radio base station, including a measurement unit configured to measure received signal strength of an uplink signal transmitted by a mobile station, and a transmission unit configured to transmit IQ data and control information to a radio equipment controller provided in the radio base station by using a frame including an IQ data region for mapping the IQ data and a control region for mapping the control information, the IQ data being obtained by subjecting the uplink signal to demodulation processing, wherein the transmission unit is configured to map information indicating the received signal strength measured by the measurement unit to a fixed region in the control region.

The third feature of the present invention is summarized in that a radio equipment controller provided in a radio base station, including an extraction unit configured to extract IQ data obtained by causing a radio equipment provided in the radio base station to subject an uplink signal from a mobile station to demodulation processing, and to extract control information, from a frame received by the radio equipment, wherein the extraction unit is configured to extract information indicating received signal strength of the uplink signal included in the extracted control information and measured by the radio equipment.

Effect of the Invention

As described above, according to the present invention, it is possible to provide a radio base station which allows a radio equipment controller REC to recognize received electric power itself of an uplink signal received by a radio equipment RE, and to provide the radio equipment RE and the radio equipment controller REC.

MODES FOR CARRYING OUT THE INVENTION (Configuration of Radio Base Station According to First Embodiment of Present Invention)

A configuration of a radio base station BTS according to a first embodiment of the present invention will be described with reference to FIG. 1 through FIG. 5.

Figure 1:
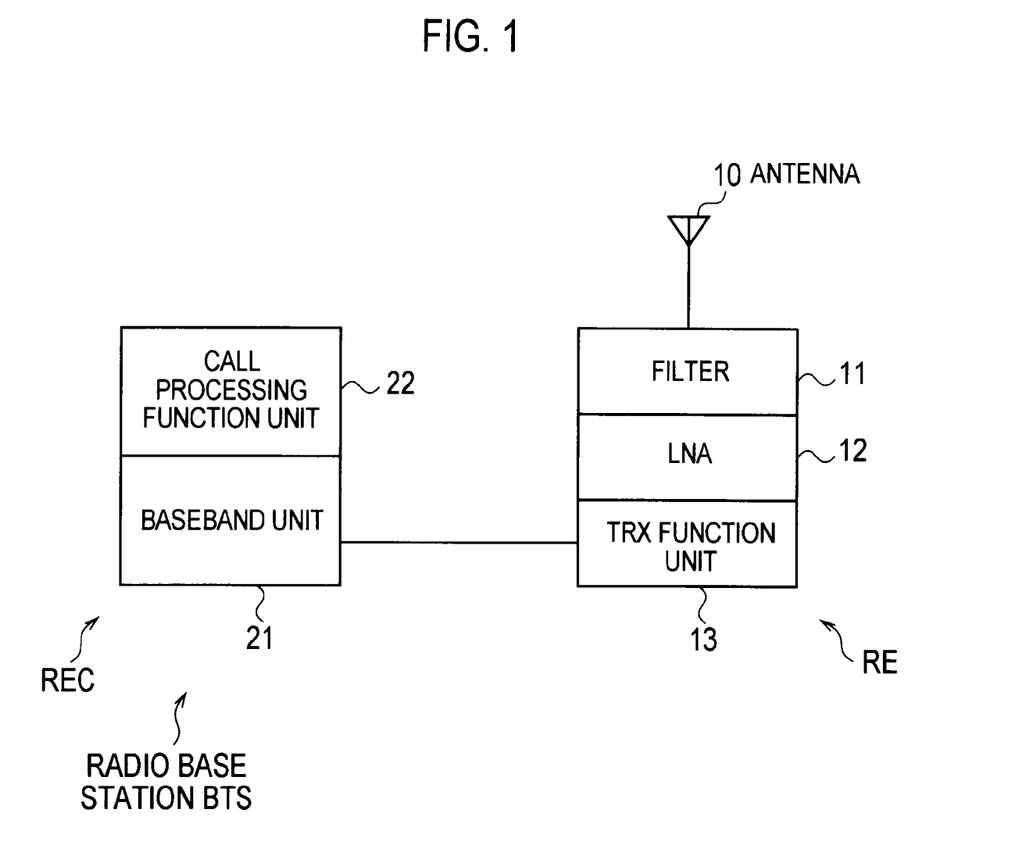
FIG. 1 is a functional block diagram of a radio base station according to a first embodiment of the present invention.

As shown in FIG. 1, the radio base station BTS according to the embodiment includes a radio equipment RE and a radio equipment controller REC. Here, the radio equipment RE and the radio equipment controller REC are different devices which are connected to each other by an optical line, an electric line, or the like.

As a function of a reception system, the radio equipment RE includes a reception antenna 10, a filter 11, an LNA (Low Noise Amplifier) 12, and a TRX function unit 13.

The filter 11 is configured to remove an interfering wave signal from an uplink signal which is transmitted by a mobile station UE and received by the reception antenna 10.

The LNA 12 is configured to amplify a desired wave signal in a signal inputted from the filter 11.

Figure 2:
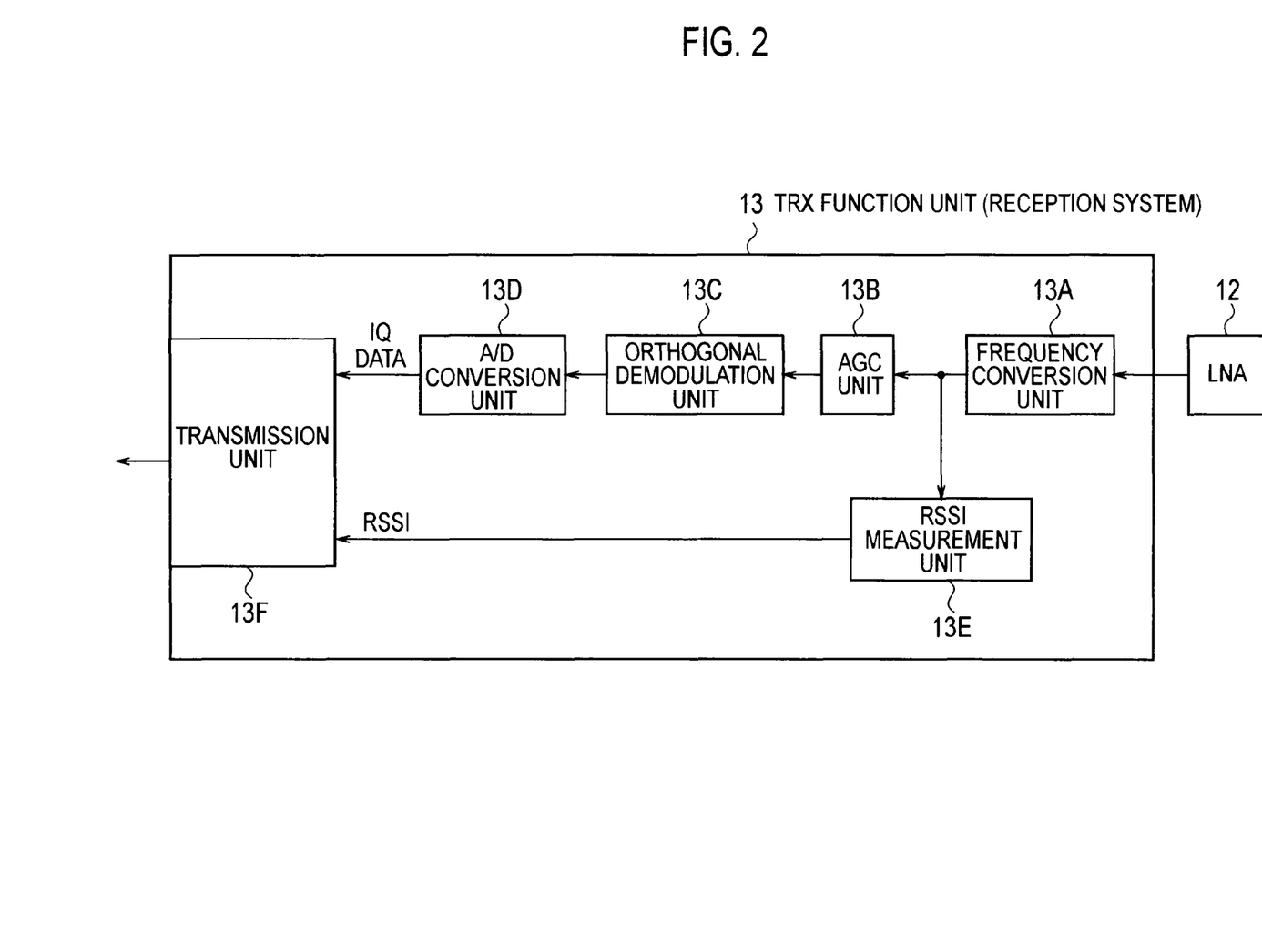
FIG. 2 is a functional block diagram of a TRX function unit in the radio base station according to the first embodiment of the present invention.

As shown in FIG. 2, the TRX function unit 13 includes a frequency conversion unit 13A, an AGC (Automatic Gain Control) unit 13B, an orthogonal demodulation unit 13C, an A/D conversion unit 13D, a RSSI measurement unit 13E, and a transmission unit 13F.

The frequency conversion unit 13A is configured to convert a radio frequency signal inputted from the LNA 12 into a baseband signal.

The AGC unit 13B is configured to output a signal at a constant output level by subjecting a signal inputted from the frequency conversion unit 13A to AGC processing. Here, the AGC processing is processing to change the output level of the signal depending on an input level of the signal.

Here, the AGC unit 13B may also be configured to determine whether or not to subject a signal inputted from the frequency conversion unit 13A to the AGC processing based on a dynamic range (equal to or above 30 dB according to 3GPP) and the number of usable bits (a line bit rate) of the uplink signal.

The orthogonal demodulation unit 13C is configured to subject a signal inputted from the AGC unit 13B to demodulation processing (orthogonal demodulation processing).

The A/D conversion unit 13D is configured to subject a signal inputted from the orthogonal demodulation unit 13C to A/D conversion processing (analog-digital conversion processing) and to output IQ data.

The RSSI measurement unit 13E is configured to measure received signal strength of the signal outputted from the frequency conversion unit 13A and to output a "RSSI" (Received Signal Strength Indicator) which is information indicating the received signal strength.

The transmission unit 13F is configured to transmit the IQ data outputted from the A/D conversion unit 13D and the RSSI outputted from the RSSI measurement unit 13E to the radio equipment controller REC.

Figure 3:
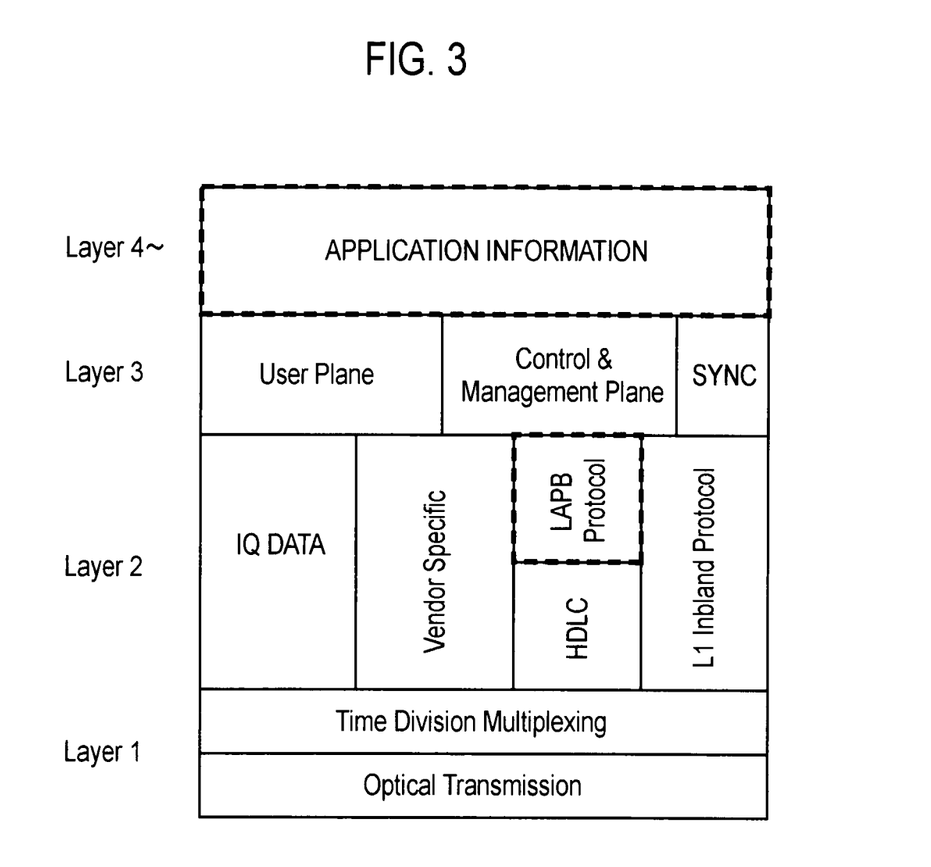
FIG. 3 is a view showing a protocol stack used between a radio equipment and a radio equipment controller in the radio base station according to the first embodiment of the present invention.

Now, a protocol stack used between the radio equipment RE and the radio equipment controller REC is shown in FIG. 3.

In an example in FIG. 3, the transmission unit 13F is configured to transmit "User Plane", "Control and Management Plane", and "Synchronization Information (SYNC)" to the radio equipment controller REC by Layer 3 communications.

Specifically, the transmission unit 13F is configured to map application information received from an upper layer (Layer 4) to any of the "User Plane", the "Control and Management Plane" and the "Synchronization Information".

Meanwhile, the transmission unit 13F is configured to transmit the IQ data and control information to the radio equipment controller REC by Layer 2 communications.

Here, as shown in FIG. 3, the control information includes vender specific control information (Vender specific), LAPB protocol control information (LAPB Protocol), HDLC protocol control information (HDLC), and L1 inband protocol control information (L1 Inband Protocol).

Here, the L1 inband protocol is a protocol for performing maintenance or the like of a state of link in Layer 1.

Meanwhile, the transmission unit 13F is configured to transmit the information received from Layer 2 to the radio equipment controller REC by Layer 1 communications by using optical transmission and a time-division multiplex method.

Figure 4:
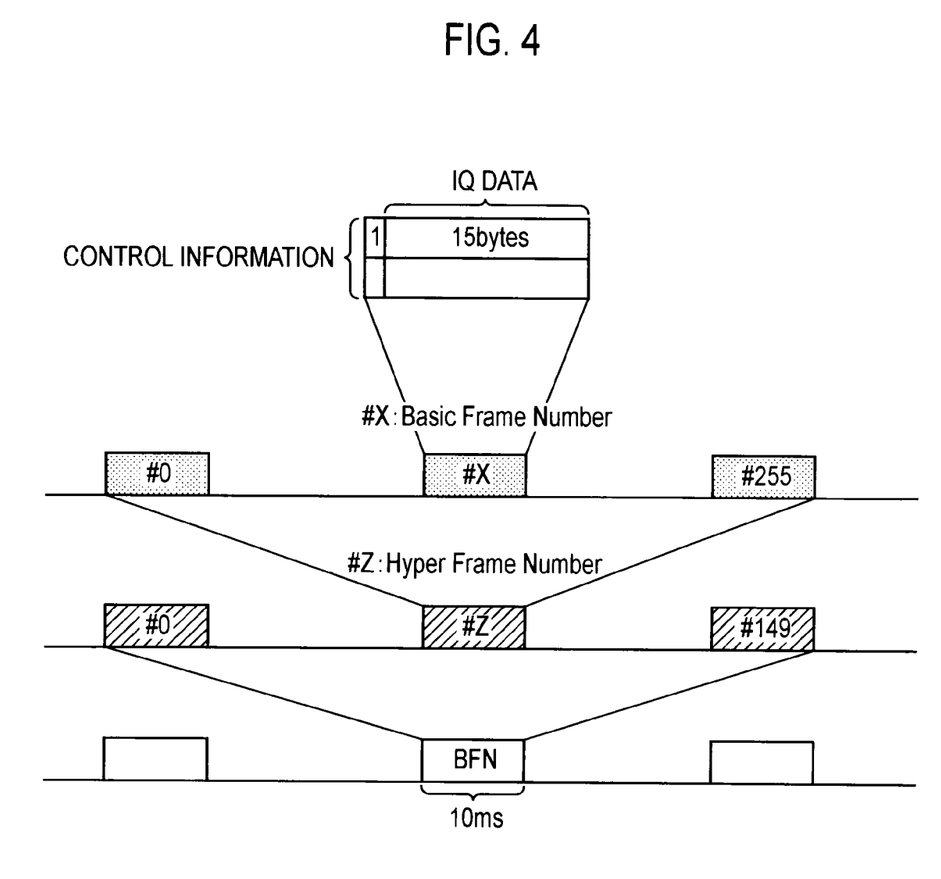
FIG. 4 is a view for explaining timing for transmission of frames by the TRX function unit in the radio base station according to the first embodiment of the present invention.

Specifically, as shown in FIG. 4, the transmission unit 13F is configured to transmit the information received from Layer 3 (the "User Plane", the "Control and Management Plane", or the "Synchronization Information") to the radio equipment controller REC by use of a frame including an IQ data region for mapping the IQ data and a control region for mapping the control information.

Here, the transmission unit 13F is configured to map the RSSI outputted from the RSSI measurement unit 13E to a fixed region inside the control region, namely, a region (Vender Specific) for mapping the vender specific control information.

As shown in FIG. 4, the transmission unit 13F is configured to transmit one radio base station frame (NodeB Frame) specified by a "BFN (NodeB Frame Number)" every 10 milliseconds.

Note that one radio base station frame includes 150 hyper frames while one hyper frame includes 256 basic frames.

Here, each hyper frame is specified by a "HFN (Hyper Frame Number)" and each basic frame is specified by a "Basic Frame Number".

Figure 5:
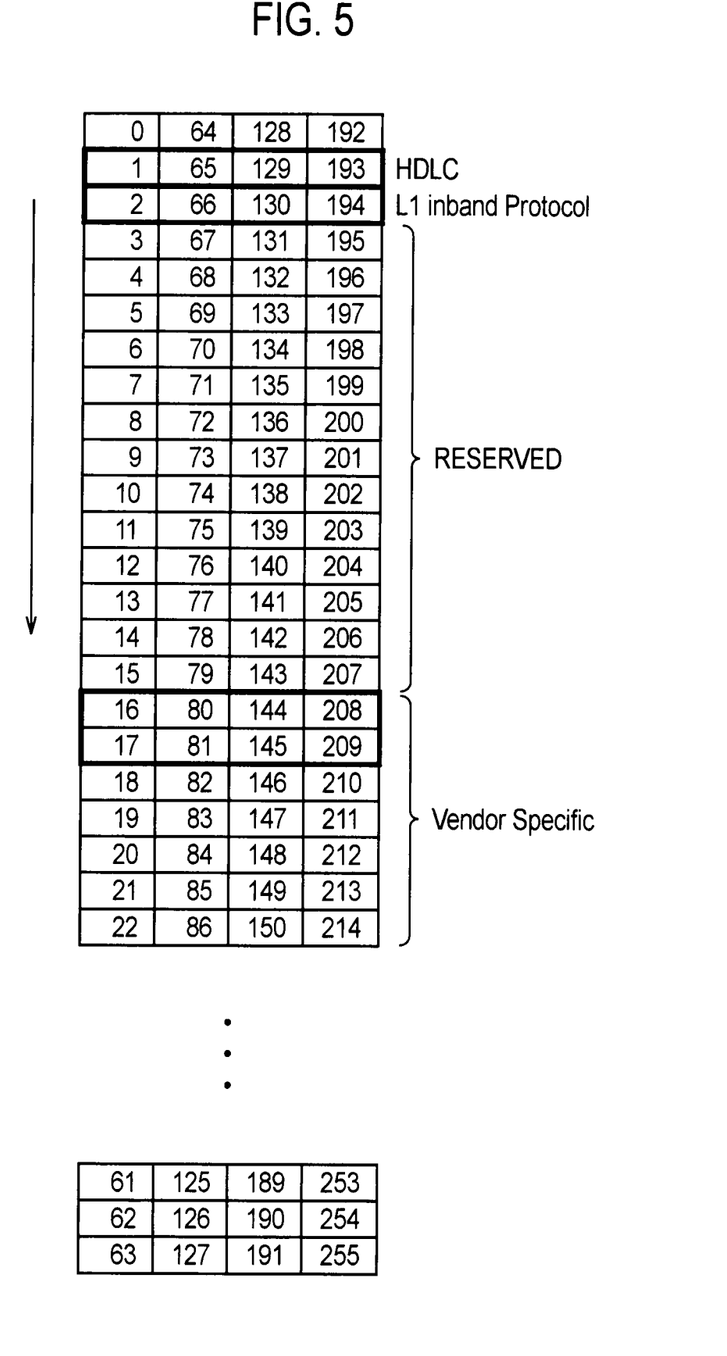
FIG. 5 is a view for explaining a method of mapping RSSI information in a frame transmitted by the TRX function unit in the radio base station according to the first embodiment of the present invention.

FIG. 5 shows 256 basic frames constituting one hyper frame. In the example of FIG. 5, the basic frames #1, #65, #129, and #193 are regions for mapping the HDLC protocol control information (HDLC), the basic frames #2, #66, #130, and #194 are regions for mapping the L1 inband protocol control information (L1 Inband Protocol), and the basic frames #16 to #22, #80 to #86, #144 to #150, and #208 to #214 are regions for mapping the vender specific control information (Vender Specific).

Here, the transmission unit 13F is configured to map the RSSI outputted from the RSSI measurement unit 13E to the basic frames #16, #17, #80, #81, #144, #145, #208, and #209.

Note that the transmission unit 13F can also map the RSSI outputted from the RSSI measurement unit 13E to the above-described "Control and Management Plane". However, other maintenance monitor signals are also mapped to the "Control and Management Plane". As a consequence, the radio equipment controller REC cannot specify the timing to transmit the RSSI.

Meanwhile, in the example of FIG. 5, other basic frames (except for reserved basic frames and basic frames for mapping the LAPB protocol control information (LAPB Protocol)) are regions for mapping the IQ data.

Therefore, the transmission unit 13F is configured to map the IQ data outputted from the A/D conversion unit 13D to these basic frames.

Here, the RSSI measurement unit 13E is configured to measure the received signal strength for each combination of the reception antenna 10 and a used carrier. Accordingly, the transmission unit 13F is configured to map the information (RSSI) indicating all of the measured received signal strength to the fixed region in the control region.

Meanwhile, the transmission unit 13F may be configured to notify the RSSI only once in a single radio base station frame.

As shown in FIG. 1, the radio equipment controller REC includes a baseband unit 21 and a call processing function unit 22.

The baseband unit 21 is configured to extract the IQ data and the control information from the frames received by the radio equipment RE. Specifically, the baseband unit 21 is configured to extract the information (RSSI) indicating the received signal strength of the uplink signal measured by the radio equipment RE, which is included in the extracted control information.

Moreover, the baseband unit 21 is configured to subject the IQ data transmitted by the radio equipment RE to baseband processing.

Meanwhile, the call processing function unit 22 is configured to subject a signal outputted from the baseband processing unit 21 to call processing.

Here, the baseband unit 21 and the call processing function unit 22 are configured to perform processing for providing an EUL service and processing for performing call processing control and maintenance monitor control based on a total traffic volume, according to the RSSI transmitted by the radio equipment RE.

(Advantageous Effect of Radio Base Station According to First Embodiment of Present Invention)

According to the radio base station of the first embodiment of the present invention, the radio equipment controller REC can recognize received electric power itself (absolute electric power) of the uplink signal received by the radio equipment RE based on the RSSI transmitted by the radio equipment RE. Hence it is possible to provide the EUL service and to perform the call processing control and the maintenance monitor control based on the total traffic volume, with reference to the absolute electric power.

Moreover, according to the radio base station of the first embodiment of the present invention, the received signal strength of the uplink signal is measured on the radio equipment RE side close to the reception antenna 10. Therefore, calculation accuracy of the received signal strength of the uplink signal is improved as compared with the case where the received signal strength of the uplink signal is calculated by the radio equipment controller REC side.

Furthermore, according to the radio base station of the first embodiment of the present invention, the RSSI is notified while being mapped to the fixed region in the control region in the frame. Therefore, the radio equipment controller REC can recognize the timing when the RSSI is transmitted and calculation accuracy of the received signal strength of the uplink signal is improved.

The above-described characteristics of the embodiment may also be expressed as follows.

The feature of a first aspect of the embodiment resides in a radio base station BTS including a radio equipment RE and a radio equipment controller REC, wherein the radio equipment RE includes a TRX function unit 13 configured to measure received signal strength of an uplink signal transmitted by a mobile station UE, and configured to transmit the IQ data and the control information to the radio equipment controller REC by using a frame including an IQ data region for mapping IQ data and a control region for mapping control information, the IQ data being obtained by subjecting the uplink signal to demodulation processing (orthogonal demodulation processing), and the TRX function unit 13 is configured to map information (RSSI) indicating the measured received signal strength to a fixed region in the control region.

In the first aspect of the embodiment, the TRX function unit 13 may be configured to map the IQ data to the IQ data region, the IQ data obtained by subjecting the uplink signal to AGC processing and then to the demodulation processing.

In the first aspect of the embodiment, the TRX function unit 13 may be configured to measure the received signal strength for each combination of a reception antenna 10 and a used carrier, and may be configured to map information (RSSI) indicating all of the measured received signal strength to the fixed region in the control region.

The feature of a second aspect of the embodiment resides in a radio equipment RE provided in a radio base station BTS, the radio equipment RE comprising: a TRX function unit 13 configured to measure received signal strength of an uplink signal transmitted by a mobile station UE, and configured to transmit the IQ data and the control information to the radio equipment controller REC provided in the radio base station BTS by using a frame including an IQ data region for mapping IQ data and a control region for mapping control information, the IQ data being obtained by subjecting the uplink signal to demodulation processing (orthogonal demodulation processing), wherein the TRX function unit 13 is configured to map information (RSSI) indicating the measured received signal strength to a fixed region in the control region.

In the second aspect of the embodiment, the TRX function unit 13 may be configured to map the IQ data to the IQ data region, the IQ data obtained by subjecting the uplink signal to AGC processing and then to the demodulation processing.

In the second aspect of the embodiment, the TRX function unit 13 may be configured to measure the received signal strength for each combination of a reception antenna 10 and a used carrier, and may be configured to map information (RSSI) indicating all of the measured received signal strength to the fixed region in the control region.

The feature of a third aspect of the embodiment resides in a radio equipment controller REC provided in a radio base station BTS, the radio equipment controller REC comprising: a baseband unit 21 configured to extract IQ data obtained by causing a radio equipment RE provided in the radio base station BTS to subject an uplink signal from a mobile station UE to demodulation processing (orthogonal demodulation processing), and to extract control information, from a frame received by the radio equipment RE, wherein the baseband unit 21 is configured to extract information (RSSI) indicating received signal strength of the uplink signal included in the extracted control information and measured by the radio equipment RE.

In the third aspect of the embodiment, the radio equipment controller REC may further comprise a call processing function unit 22 configured to perform call processing by using the information (RSSI) indicating the received signal strength.

Note that operation of the above described the radio base stations BTS may be implemented by means of hardware, a software module executed by a processor, or a combination of both.

The software module may be provided in any type of storage medium such as an RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided in the radio base station BTS. Also, the storage medium and the processor may be provided in the radio base station BTS as a discrete component.

Hereinabove, the present invention has been described in detail using the above embodiment; however, it is apparent to those skilled in the art that the present invention is not limited to the embodiment described herein. Modifications and variations of the present invention can be made without departing from the spirit and scope of the present invention defined by the description of the scope of claims. Thus, what is described herein is for illustrative purpose, and has no intention whatsoever to limit the present invention.

The invention claimed is:

1. A radio base station comprising:
   a radio equipment; and
   a radio equipment controller, wherein
   the radio equipment includes:
      a measurement unit configured to measure received signal strength of an uplink signal transmitted by a mobile station; and
      a transmission unit configured to transmit IQ data and control information to the radio equipment controller by using a hyper frame that is made up of a plurality of basic frames, the hyper frame including an IQ data region of basic frames for mapping the IQ data and a control region of basic frames for mapping the control information, the IQ data being obtained by subjecting the uplink signal to demodulation processing, and
   the transmission unit is configured to insert information indicating the received signal strength measured by the measurement unit into a fixed region of basic frames within the control region of the hyper frame, such that the IQ data and the received signal strength are transmitted within the same hyper frame.

2. The radio base station according to claim 1, wherein the transmission unit is configured to map the IQ data to the IQ data region, the IQ data obtained by subjecting the uplink signal to AGC processing and then to the demodulation processing.

3. The radio base station according to claim 1, wherein the measurement unit is configured to measure the received signal strength for each combination of a reception antenna and a used carrier, and
   the transmission unit is configured to insert information indicating all of the measured received signal strength to the fixed region of basic frames within the control region.

4. A radio equipment provided in a radio base station, comprising:
   a measurement unit configured to measure received signal strength of an uplink signal transmitted by a mobile station; and
   a transmission unit configured to transmit IQ data and control information to a radio equipment controller provided in the radio base station by using a hyper frame that is made up of a plurality of basic frames, the hyper frame including an IQ data region of basic frames for mapping the IQ data and a control region of basic frames for mapping the control information, the IQ data being obtained by subjecting the uplink signal to demodulation processing, wherein
   the transmission unit is configured to insert information indicating the received signal strength measured by the measurement unit into a fixed region of basic frames within the control region of the hyper frame, such that the IQ data and the received signal strength are transmitted within the same hyper frame.

5. The radio equipment according to claim 4, wherein the transmission unit is configured to map the IQ data to the IQ data region, the IQ data obtained by subjecting the uplink signal to AGC processing and afterward to the demodulation processing.

6. The radio equipment according to claim 4, wherein the measurement unit is configured to measure the received signal strength for each combination of a reception antenna and a used carrier, and
   the transmission unit is configured to map information indicating all of the measured received signal strength to the fixed region in the control region.

7. A radio equipment controller provided in a radio base station, comprising:
   an extraction unit configured to extract IQ data obtained by causing a radio equipment provided in the radio base station to subject an uplink signal from a mobile station to demodulation processing, and to extract control information, from a hyper frame that is made up of a plurality of basic frames received by the radio equipment, the hyper frame including an IQ data region of basic frames for mapping the IQ data and a control region of basic frames for mapping the control information, wherein
   the extraction unit is configured to extract information indicating received signal strength of the uplink signal included in a fixed region of basic frames within the control region of the hyper frame, such that the IQ data and the received signal strength are extracted from the same hyper frame.

8. The radio equipment controller according to claim 7, further comprising:
   a call processing function unit configured to perform call processing by using the information indicating the received signal strength.

* * * * *